June 30, 1936.     H. J. WOOCK     2,045,937
TIRE MOUNTING RIM CONSTRUCTION
Original Filed June 6, 1932    2 Sheets-Sheet 1
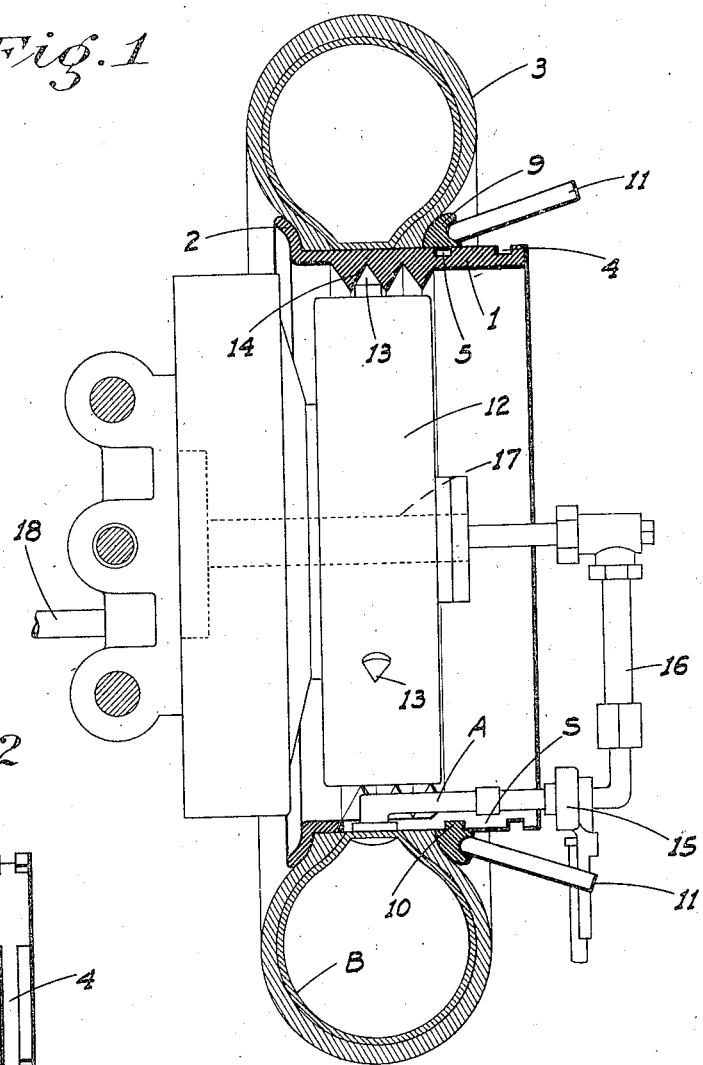
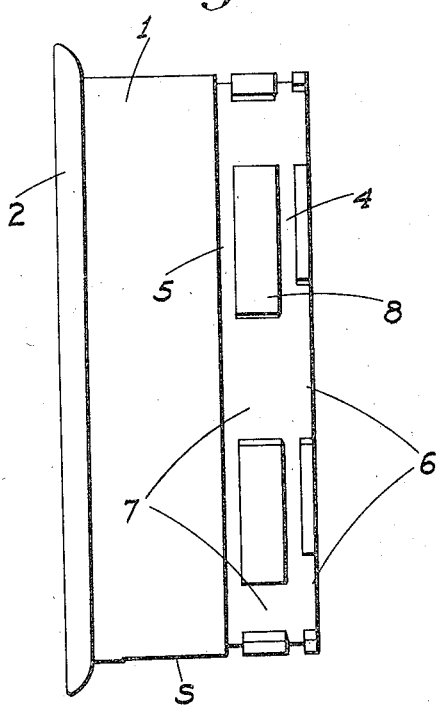
INVENTOR
H. J. Woock
BY
ATTORNEY June 30, 1936.  H. J. WOOCK  2,045,937
TIRE MOUNTING RIM CONSTRUCTION
Original Filed June 6, 1932   2 Sheets-Sheet 2

INVENTOR
H. J. Woock
BY
ATTORNEY

Patented June 30, 1936

2,045,937

UNITED STATES PATENT OFFICE 2,045,937

TIRE MOUNTING RIM CONSTRUCTION

Herbert J. Woock, Lodi, Calif., assignor to Super Mold Corporation, Lodi, Calif., a corporation Original application June 6, 1932, Serial No. 615,641. Divided and this application June 17, 1935, Serial No. 26,982

1 Claim. (Cl. 18—18)

This invention relates to rims to support tires in order to carry out retreading or like operations, being a division of the corresponding subject matter shown in my Patent No. 2,009,643 dated July 30, 1935.

The rim is of a type adapted to receive tires of different cross sectional dimensions but of a common rim size, and in this respect is the same in its function as the rim shown in my Patent No. 1,913,739, dated June 13, 1933, as well as that in Patent No. 1,914,474, dated June 20, 1933. My present construction however represents modifications and improvements over these previous devices in that the number of parts necessary is lessened, since the use of adjustable bolts, latches etc. is avoided, and much faster operation is possible.

In the drawings similar characters of reference indicate corresponding parts in the several views:

Figure 1 is a transverse section of my improved rim showing the same as mounted on the rotary chuck of a tire retreading machine as shown in said Pat. No. 2,009,643.

Figure 2 is a side elevation of the rim detached.

Figure 3:
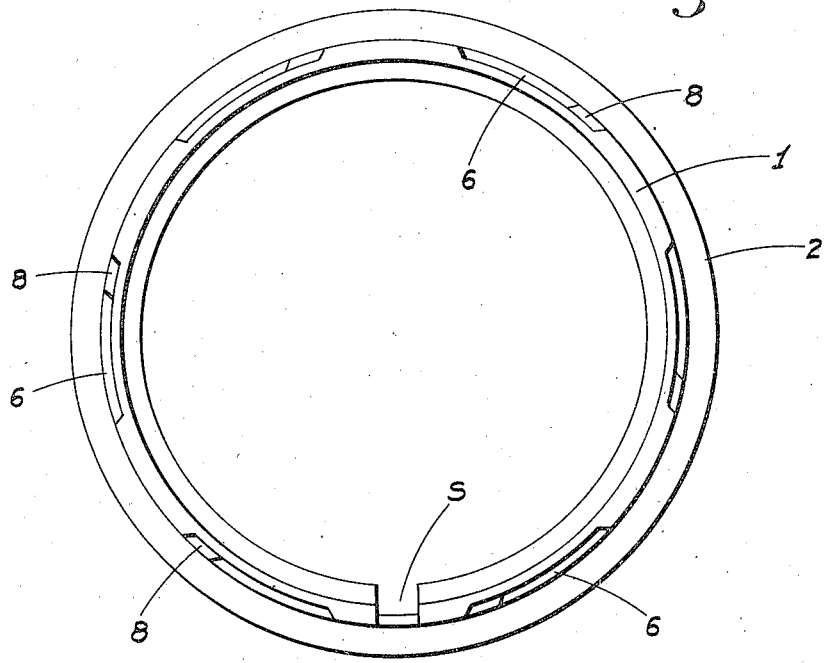
Figure 3 is a front view of the rim.
Figure 4:
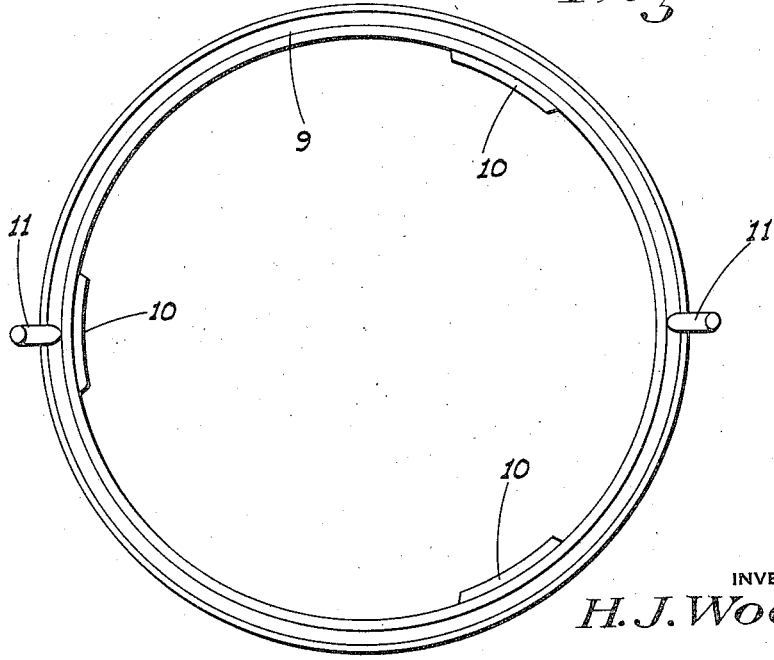
Figure 4 is a similar view of the locking ring.

Referring now more particularly to the characters of reference on the drawings, the rim 1 is a one-piece member of cylindrical band-like form, and has the usual outwardly projecting flange 2 at the back for engagement with the corresponding bead of a tire 3 to be mounted on the rim.

Circumferentially extending transversely spaced front and back grooves 4 and 5 respectively of rectangular cross section and of the same size are formed in the outer periphery of the rim toward the front or toward that edge opposite the flange 2. Transversely extending and equally spaced relatively wide passages or recesses 6 are cut in the outer periphery of the rim from the front edge thereof to adjacent the front grooves 4; while other similarly spaced recesses or passages 7 are cut through the rim from the inner wall of the groove 4 to the outer wall of the groove 5.

The bottoms of these passages are on the same level as the bottoms of the grooves and while both sets of passages terminate at one end in alined relation with each other, the passages 6 are longer circumferentially of the rim than the passages 7, as clearly shown in Figure 2. The uncut metal between the grooves 4 and 5 therefore form spaced blocks 8 which at one end overhang the adjacent end of the corresponding passages 6 and form abutments for the purpose which will be seen later.

The locking ring 9 of the rim is also a one-piece unbroken or non-split element, being shaped on its inner face to engage the corresponding bead of the tire. The internal diameter of this ring is such that it may be readily slid onto the rim and turned thereon without restraint, the blocks 8 and the uncut metal outwardly of the groove 4 being the same diameter as the remaining outer periphery of the rim, so as to form a proper support for the ring. Projecting inwardly of the ring is a row of lugs 10, slightly smaller in cross sectional size than the grooves 4 or 5, though symmetrical thereto. The lugs are spaced apart circumferentially the same as the recesses or passages 6 and 7 but are somewhat shorter circumferentially of the ring than the corresponding dimension of the passages 7.

In operation the tire is first slid onto the rim to engage the flange 2, the rim being provided with a transverse slot S extending back from the front and receiving the air stem A of the pressure bag B of the tire. The locking ring 9 is then placed on the rim so that the lugs 10 enter the passages 6, and said ring is then slid transversely of the rim until said lugs register either with the grooves 4 or 5, whereupon the ring is then rotated on the rim to cause the lugs to pass into the adjacent portions of one or the other of said grooves. If the tire is of relatively small transverse dimensions, the ring is pushed onto the rim until the lugs 10 engage the back wall of the groove 5, so that when the ring is turned the lugs will enter said groove. If the tire is of relatively large transverse dimensions the ring is initially positioned so that when slid onto the rim the lugs will face up against the abutments 9. This of course definitely positions the lugs so that they will enter the outer groove 4 when the ring is rotated. To facilitate manipulation of the ring it is provided with opposed handles 11.

If the rim is to be used on a retreading machine, such as shown in the aforementioned Patent No. 2,009,643, it is mounted on the rotary chuck 12 of said machine, said chuck having radial chuck pins 13 releasably engaging in a V-shaped groove 14 formed on the inner face of the rim. The rim however may be used to support a tire in a vulcanizing mold such as that shown in my Patent No. 1,914,474 previously mentioned.

If used on said retreading machine, the air stem A is provided with an element whereby detachable airtight connection may be made with the adjacent end of a cooperating fitting 15 which is swivelly mounted on a telescopic air passage unit 16. This unit extends radially of the tire from the outer end of a passage in the chuck supporting spindle 17 and whose opposite end is connected to an air supply pipe 18. In this manner the air bag within the tire may be maintained under any desired pressure irrespective of the rotation of the tire, as fully set forth in said copending application.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention, what I claim as new and useful and desire to secure by Letters Patent is:

A tire supporting rim comprising a rim band to receive a tire and having a bead engaging flange about one edge of the band, a locking ring slidable onto the band from its opposite edge to engage the other bead of the tire, said band having a pair of transversely spaced circumferential grooves in its outer face adjacent its opposite edge, circumferentially spaced passages leading from said edge to the innermost groove and intersecting the outermost groove, and lugs projecting inwardly from the ring in spaced relation corresponding to the passages and of a length and depth less than that of the passages to freely enter the same, and of a width less than that of the grooves to enter the same when said lugs are moved along the passage into transverse alinement with either groove and the ring is then rotated; the portions of the passages extending between the edge of the band and the outermost groove being wider than the portions of the passages extending between the grooves, while the walls of said passage portions at one side lie in common alinement whereby the inner wall offset formed between the wide and narrow portions of the passages at the inner wall of the outer groove form abutments useable for engagement with the lugs to locate the latter in alinement with said outer groove.

HERBERT J. WOOCK.